United States Patent
Dudek et al.

(10) Patent No.: US 12,528,650 B2
(45) Date of Patent: Jan. 20, 2026

(54) TRANSFER DEVICE

(71) Applicant: Interroll Holding AG, Sant'Antonino (CH)

(72) Inventors: Siegmund Dudek, Hückelhoven (DE); Erwin Mans, Hückelhoven (DE)

(73) Assignee: INTERROLL HOLDING AG, Sant'Antonino (CH)

( * ) Notice: Subject to any disclaimer, the term of this patent is extended or adjusted under 35 U.S.C. 154(b) by 78 days.

(21) Appl. No.: 18/615,837

(22) Filed: Mar. 25, 2024

(65) Prior Publication Data

US 2024/0327127 A1 Oct. 3, 2024

(30) Foreign Application Priority Data

Mar. 31, 2023 (EP) ..................................... 23166144

(51) Int. Cl.
  *B65G 15/12* (2006.01)
  *B65G 17/34* (2006.01)
  *B65G 23/44* (2006.01)
  *B65G 47/94* (2006.01)

(52) U.S. Cl.
  CPC ........... *B65G 15/12* (2013.01); *B65G 17/345* (2013.01); *B65G 23/44* (2013.01); *B65G 47/945* (2013.01)

(58) Field of Classification Search
  CPC ....... B65G 17/345; B65G 47/94; B65G 23/44
  USPC .............................................. 198/370.06, 814
  See application file for complete search history.

(56) References Cited

U.S. PATENT DOCUMENTS

| | | | | |
|---|---|---|---|---|
| 4,096,936 A | * | 6/1978 | Nielsen ................. | B65G 39/00 |
| | | | | 198/370.06 |
| 7,562,761 B2 | * | 7/2009 | Tasma .................. | B65G 17/067 |
| | | | | 198/370.02 |
| 9,409,716 B2 | * | 8/2016 | Bastian, II ............. | B65G 43/08 |
| 11,365,066 B2 | * | 6/2022 | Wang ..................... | B65G 23/06 |

(Continued)

FOREIGN PATENT DOCUMENTS

| | | |
|---|---|---|
| EP | 1153860 A1 | 11/2001 |
| EP | 3964303 A1 | 3/2022 |

(Continued)

OTHER PUBLICATIONS

Extended European Search Report for EP 23166144.8, mailed Oct. 4, 2023.

*Primary Examiner* — Mark A Deuble
(74) *Attorney, Agent, or Firm* — Raymond Wagenknecht; Biotech Beach Law PC

(57) ABSTRACT

A transfer device, adapted to convey an object in a conveying direction, and selectively transfer an object in a second direction angled to the conveying direction; the transfer device having a plurality of belt carriers, circumferentially running along the transfer device, a traction belt circumferentially running along the transfer device, along which the plurality of belt carriers is arranged; circumferentially running transfer belts forming an upper run and a lower run; wherein each belt carrier carries a transfer belt, which protrudes above the belt carrier, and wherein the plurality of transfer belts is defining a conveying plane, on which the object comes to rest during conveying; wherein for laterally transferring the object the transfer belts are selectively driven. The transfer device also has a tensioner, which is adapted to change the tension of the traction belt.

9 Claims, 6 Drawing Sheets

(56) References Cited

U.S. PATENT DOCUMENTS

2010/0022358 A1* 1/2010 Schwaiger ........... B65G 17/345
                                                                           482/54
2023/0001453 A1   1/2023  Shan

FOREIGN PATENT DOCUMENTS

| EP | 4183723 A1 * | 5/2023 | ............. B65G 23/06 |
|----|--------------|--------|--------------------------|
| WO | 2022122792 A2 | 6/2022 | |

* cited by examiner a)

b)

c)

a)

b)

TRANSFER DEVICE

CROSS-REFERENCE TO RELATED APPLICATIONS

This application claims the benefit of priority to European patent application no. EP 23166144.8, filed Mar. 31, 2023, the content of which is herein incorporated by reference in its entirety.

TECHNICAL FIELD

The invention relates to a transfer device, in particular for a conveyor arrangement.

BACKGROUND OF THE INVENTION

The invention is based on a transfer device for a conveyor arrangement as described in WO 2022/122792 A2, which is herein incorporated by reference in its entirety.

EP 3 964 303 A1 discloses a sorting system, which includes: a conveying mechanism and a control system. The conveying mechanism including: a rack, rollers arranged on the rack at intervals along a first horizontal direction; a chain wound around the two rollers; and a plurality of trolleys respectively connected to the chain and sequentially arranged along the first horizontal direction. Each trolley has a trolley body and a sorting and conveying mechanism arranged on the trolley body, and the bottom of the trolley body is configured to carry and convey packages along a second horizontal direction perpendicular to the first horizontal direction. One of the rollers is a passive roller including a tension sprocket, a tension shaft, and a tension assembly. It is an object to improve maintainability and durability of the known transfer device.

SUMMARY OF THE INVENTION

The above is accomplished by way of transfer device adapted to convey an object in a first direction, and selectively transfer an object in a second direction angled to the first direction; the transfer device having a plurality of belt carriers, circumferentially running along the transfer device. The transfer device includes a traction belt circumferentially running along the transfer device, along which the plurality of belt carriers is arranged. The circumferentially running transfer belt forming an upper run and a lower run. Each belt carrier carries a transfer belt, which protrudes above the belt carrier, and wherein the plurality of transfer belts defines a conveying plane, on which the object comes to rest during conveying. For laterally transferring the object the transfer belts are selectively driven. The transfer device comprises a tensioner which is adapted to change a tension of the traction belt.

In an embodiment the tensioner has a force storage, in particular a spring, adapted to provide a tensioning force.

In an embodiment the tensioner has a force limiter, limiting the tensioning force which is applied by the force storage to the traction belt.

In an embodiment the traction belt is wound around two deflection wheels, and the tensioner has a distance holder, wherein the distance holder is adapted to ensure a minimum distance between the two deflection wheels. In an embodiment the distance holder is the force limiter.

In an embodiment the distance holder and/or the force limiter is adapted to bridge a length of the spring, in particular the distance holder and/or said force limiter is a bushing, located coaxially around the spring.

In an embodiment the transfer device is able to selectively operate the traction belt in two directions, in particular, the traction belt can selectively be driven in a manner, that in a first operation mode a driven wheel pulls the upper run and that in a second operation mode a driven wheel pulls the lower run of the traction belt.

In an embodiment the transfer device has a plurality of deflection wheels for deflecting the traction belt, wherein all deflection wheels deflect the traction wheel inwardly, (meaning the center of the deflection is located within the traction belt).

In an embodiment the plurality of deflection wheels have exactly two deflection wheels per traction belt.

During an inventive usage of the transfer device and for adjusting the tension of the traction belt, the tensioner operates in a manner that after the belt tension is adjusted correctly the distance holder and/or the force limiter is held with play.

In particular, the tensioner is adapted to change the tension of the traction belt upon user interaction or upon a control signal.

BRIEF DESCRIPTION OF DRAWINGS

The drawings described here are used to provide further understanding of the present disclosure and form a part of the present application. Illustrative embodiments of the present disclosure and description thereof are used for explaining the present disclosure, but do not improperly limit the present disclosure. In the drawings.

DETAILED DESCRIPTION OF THE INVENTION

Figure 1:
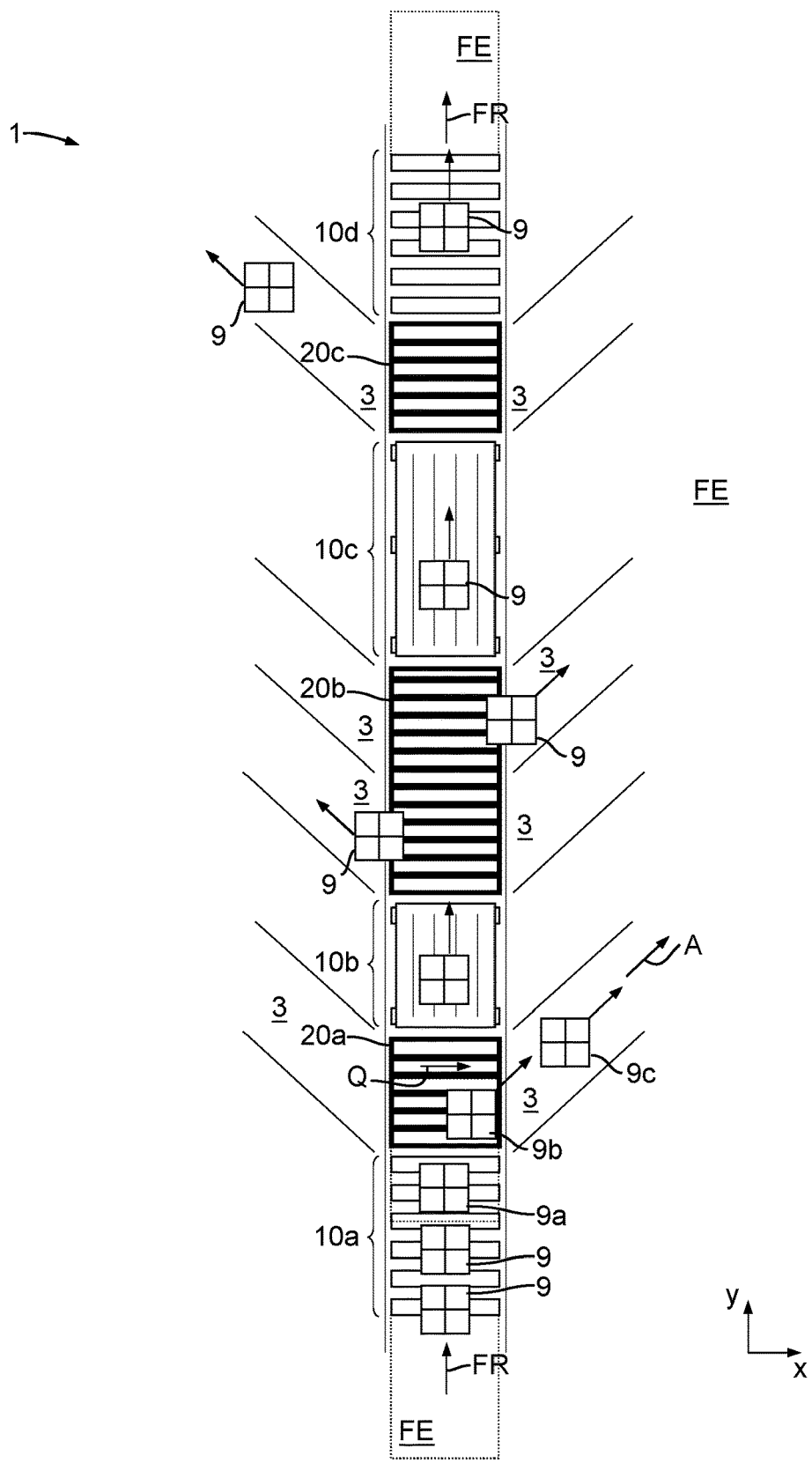
FIG. 1 is a schematical top view of a conveying arrangement having an inventive transfer device.

FIG. 1 shows a conveyor arrangement 1 having a sorting functionality, including an inventive transfer device 20. There is a plurality of conveying devices 10 for conveying objects 9, arranged one behind the other in a conveying direction FR. At first, objects 9 are fed in via a conveyor section 10a. These objects are then transferred to a first transfer device 20a. This is followed by further conveyor sections 10b . . . d and further transfer devices 20b, 20c, whereby the transfer devices 20 each are arranged between two conveying devices 10. The conveying devices 10 can be designed as a roller conveyor section 10a, 10d or as a belt conveyor section 10b, 10c.

Each of the transfer devices 20 selectively transfers selected objects 9 out of the conveying direction FR and into a transfer area 3 lateral of the conveying direction FR. For this purpose, object 9 is accelerated in the lateral direction A, at least for a short time.

In contrast to conventional crossbelt sorters, the conveyed object 9 can be taken over by such a conveyor line, which transfers the object 9 to the transfer area both in the conveying direction FR and within a conveying plane FE of the transfer device 20. It is also possible to transfer the conveyed object 9 from the transfer device 20 to a downstream conveying device 10 in which the conveyed object 9 is taken over both in the conveying direction FR and in the conveying plane FE of the transfer device 20.

Figure 2:
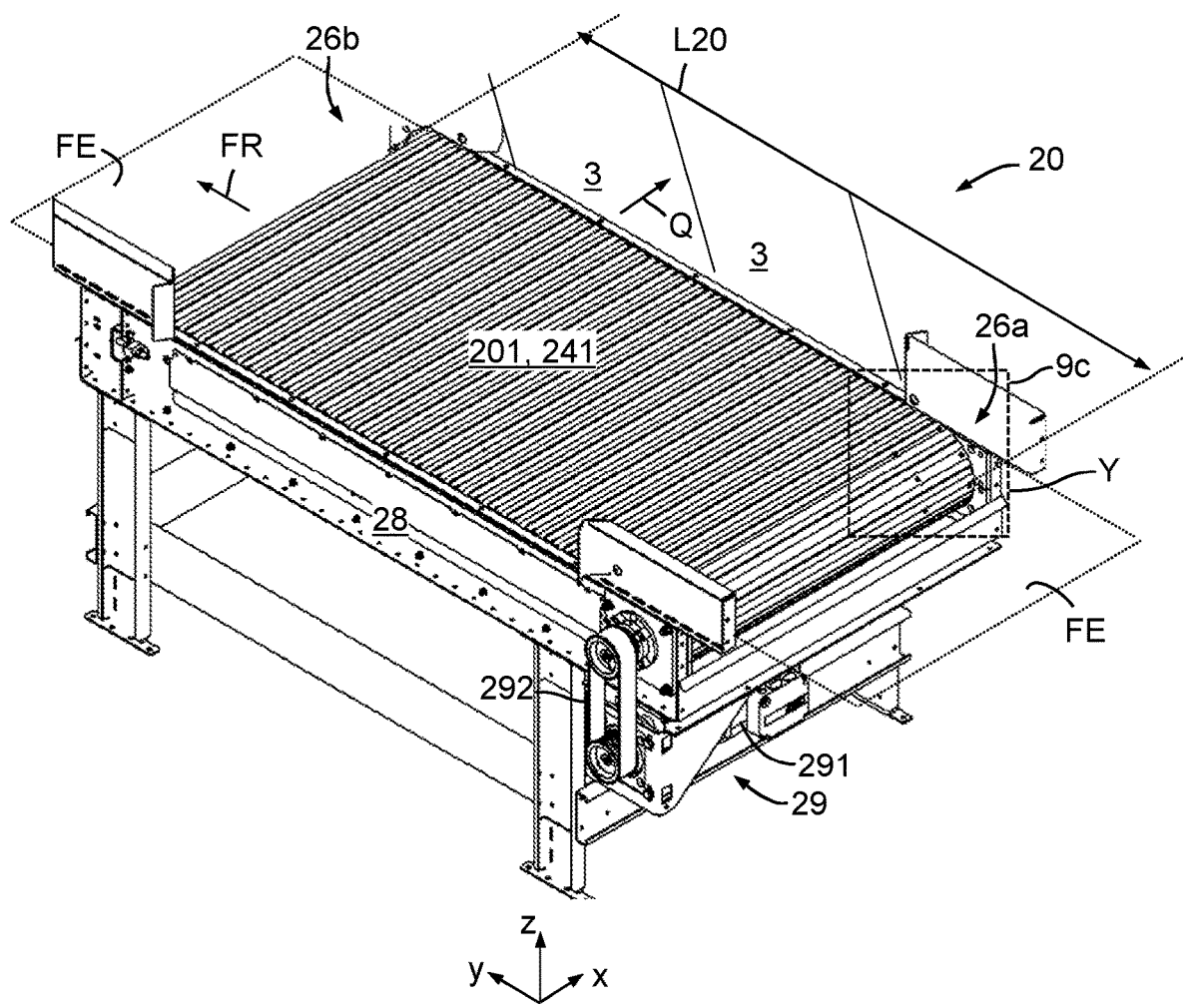
FIG. 2 is an overall perspective view of an inventive transfer device.
Figure 3:
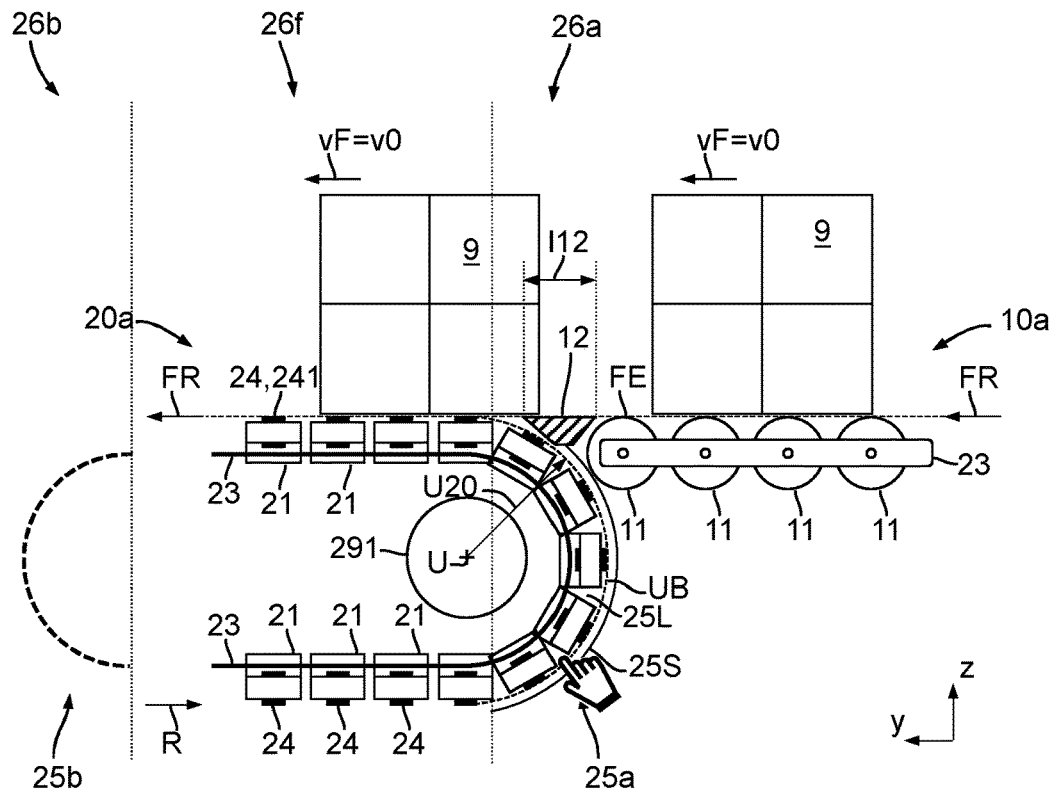
FIG. 3 is a schematical longitudinal section through a part of the conveying arrangement of FIG. 1.

FIGS. 2 and 3 show a transfer device, which is based on the transfer device shown in the earlier application WO 2011/122792 A2.

The transfer device 20 has a frame 28 with, for example, four legs. The transfer device 20 forms a conveying surface 201 on which an object 9 (not shown here) can be conveyed in conveying direction FR. The conveying surface 201 defines the conveying plane FE.

The transfer device 20 has a guide 23 (FIG. 3) along which a plurality of belt carriers 21 are arranged. The belt carriers 21 are movably arranged on the guide 23 such that the belt carriers 21 are moved in a circuit, in particular, a closed loop. At the first side, here the upper side, the belt carrier 21 moves in the conveying direction FR. At a first transfer location 26a, the conveyed object 9 is provided from the upstream conveyor section 10a and arranged on an upper side of the belt carrier 21. At a second transfer location 26b, the conveyed object 9 is provided to a downstream conveyor section 10c (not shown) and arranged on an upper side of another conveyor, provided that it has not previously been transferred laterally. A conveying area 26f is defined between the transfer locations 26a, 26b.

Each belt carrier 21 carries a transfer belt 24, the longitudinal extension of which is aligned in the traverse direction Q (see FIG. 2), which is 90° angled to the conveying direction FR. The transfer belt 24 protrudes above the belt carriers 21 and thus constitutes a support surface 241 which defines the conveying plane FE and on which the object 9 lying on it comes to rest.

Figure 4:
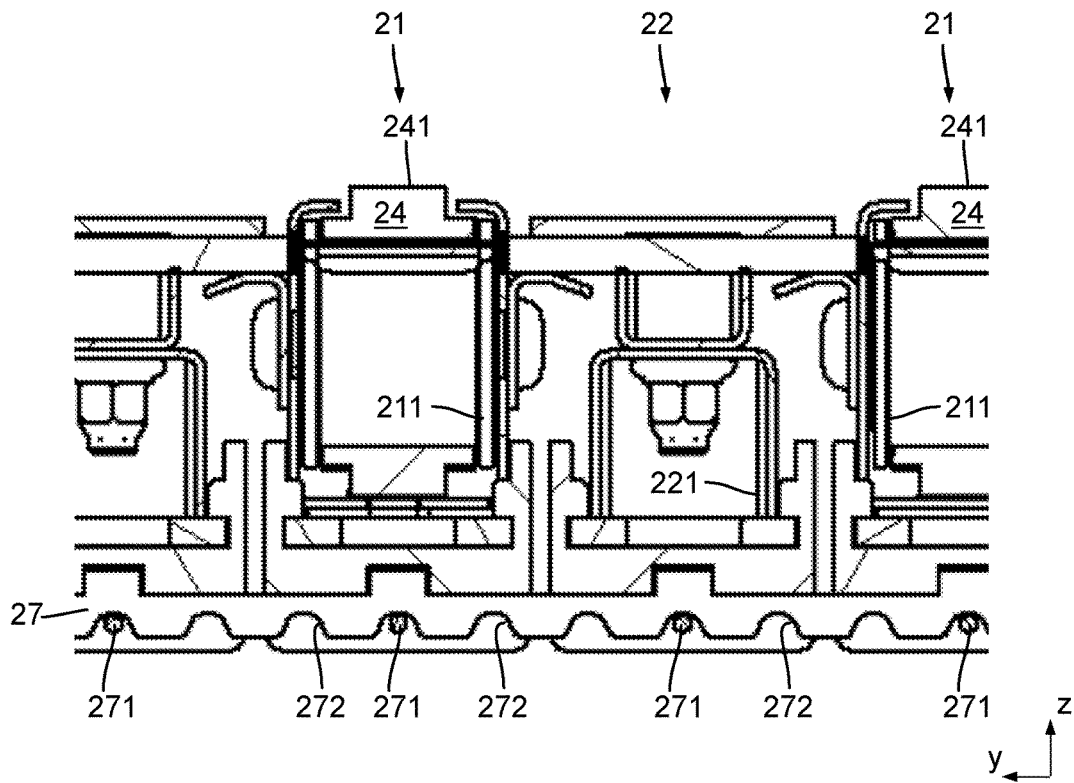
FIG. 4 is a cross section through the belt carrier of the transfer device of FIG. 2.

The belt carriers 21 are driven by a drive 29 in the conveying direction FR (FIG. 2). Therefore a traction belt 27 is provided (FIG. 4), along which the plurality of belt carriers 21 is arranged. A connector 271 (FIG. 4) is adapted to connect the belt carriers 21 to the traction belt 27.

The traction belt 27 has, in particular on its inner side, a plurality of engagements 272 (FIG. 4), which positively engages with a driven wheel 291, e.g. which may be of a drum motor or a driven wheel 291 separate to a motor. The positive engagement 272 serves to ensure, that the belt carriers 21 are driven at a speed defined by the drive 29.

For more details of the structure and the transfer functionality, reference is made to earlier application WO 2011/122792 A2, which is incorporated herein by reference in its entirety.

FIGS. 5 to 8 show a tensioner 7, with the help of which the tension of the traction belt 27 can be adjusted.

Figure 5:
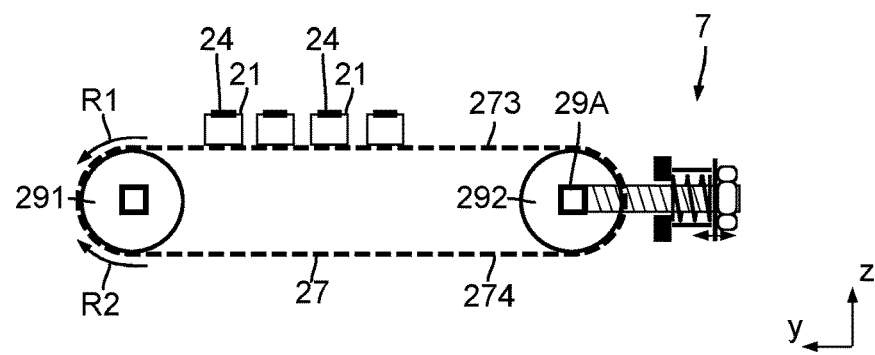
FIG. 5 is schematically a side view of a traction belt and a tensioner of the transfer device of FIG. 2.
Figure 6:
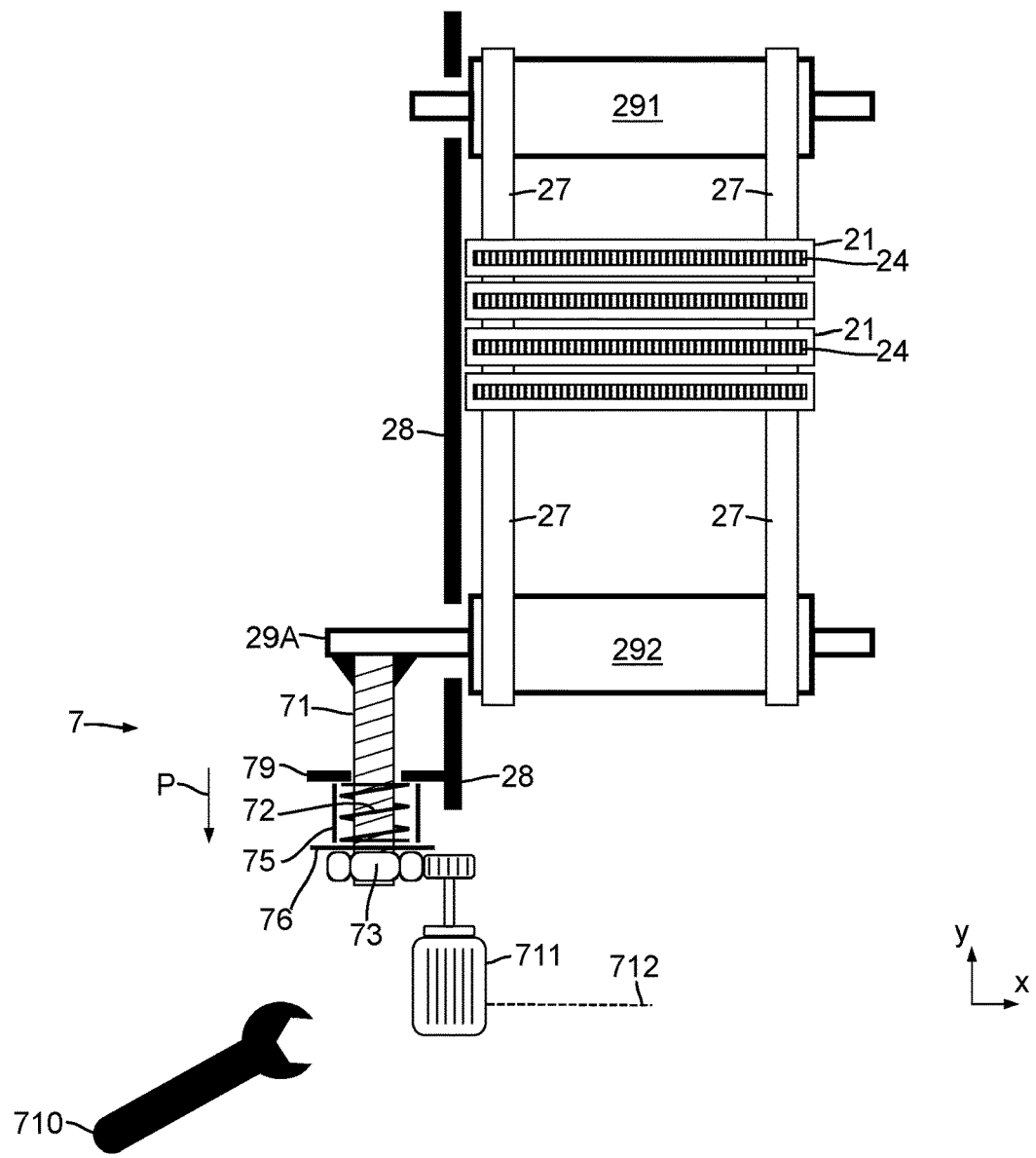
FIG. 6 is schematically a top view of the traction belt and the tensioner of the transfer device of FIG. 2.

Thereby, FIGS. 5 and 6 show schematically the tensioner 7 along with the traction belt 27, which is wound around two deflection wheels 291, 292, one of which is in addition a driven wheel 291. Some exemplary belt carriers 21 are depicted.

The traction belt 27 according to the invention is arranged in the form of a head or tail configuration. In such a configuration at least one of the deflection wheels contacting the upper run 273 is a drive wheel 291.

The inventive tensioner 7 has a threaded rod 71, which is attached to an axle 29A of one of the deflection wheels 292. The threaded rod 71 passes a stop 79. The stop 79 is fixedly attached to the frame 28.

The stop 79 is located between a screw nut 73 and the deflection wheel axle 29A. The screw nut 73 is screwed on the threaded rod 71.

Between the screw nut 73 and the stop 79 a spring 72 is located. By turning the screw nut 73 in the correct direction, the spring 72 is set under tension, resulting in a pulling or tensioning force P, pulling the threaded rod 71 in the direction away from the other deflection wheel 292, leading to tensioning the traction belt 27.

Turning the screw nut 73 can be done manually with the help of a tool 710, in particular a wrench. Alternatively, turning the screw nut 73 can be done by an actuator 711 upon receiving of a control signal 712.

A limiting bushing 75 is located coaxially around the spring 72 and axially between stop 79 and the screw nut 73.

The positive drive connection between said driven wheel 291 and said traction belt 27 requires a certain minimum belt tension. At the same time, it is important for the longevity of the traction belt 27 that it is not over-tensioned. Therefore the invention proposes the following method of adjusting the tension and maintaining the tension over the lifetime.

Figure 7:
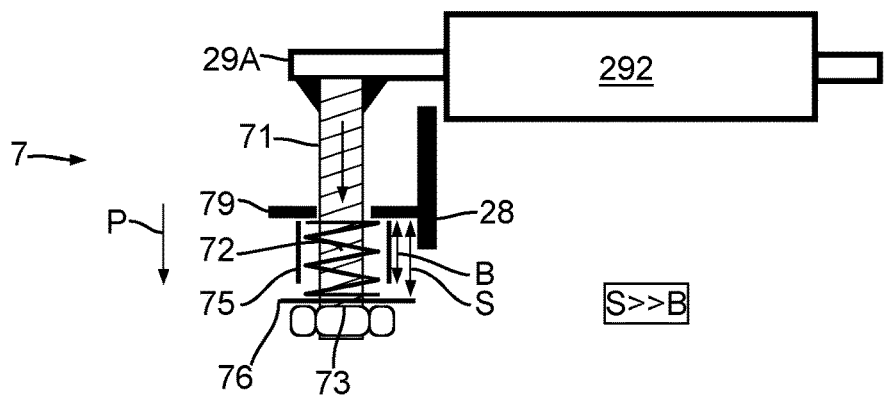
FIG. 7 is schematically a top view of the tensioner of FIG. 5, where panel a) shows a released state; panel b) shows a tensioned state; and panel c) shows an over-tensioned state.
Figure 7:
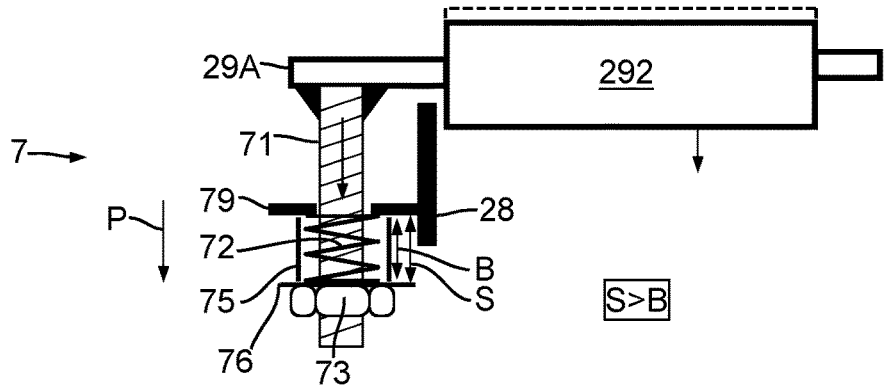
Figure 7:
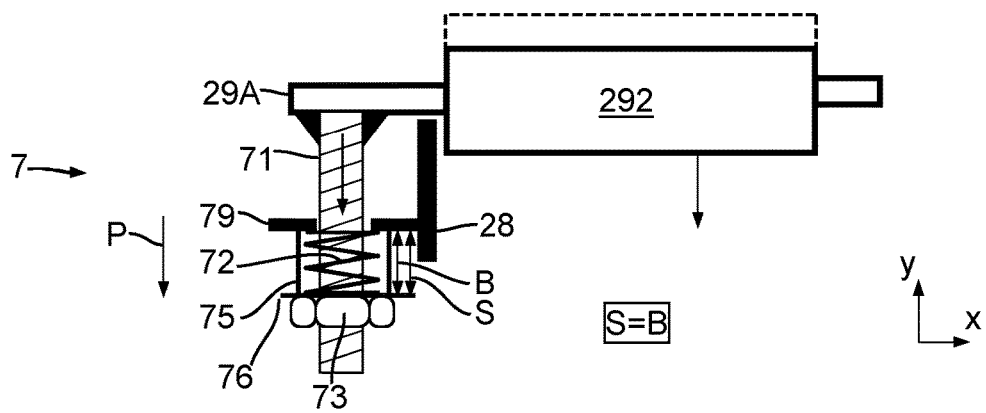
Figure 8:
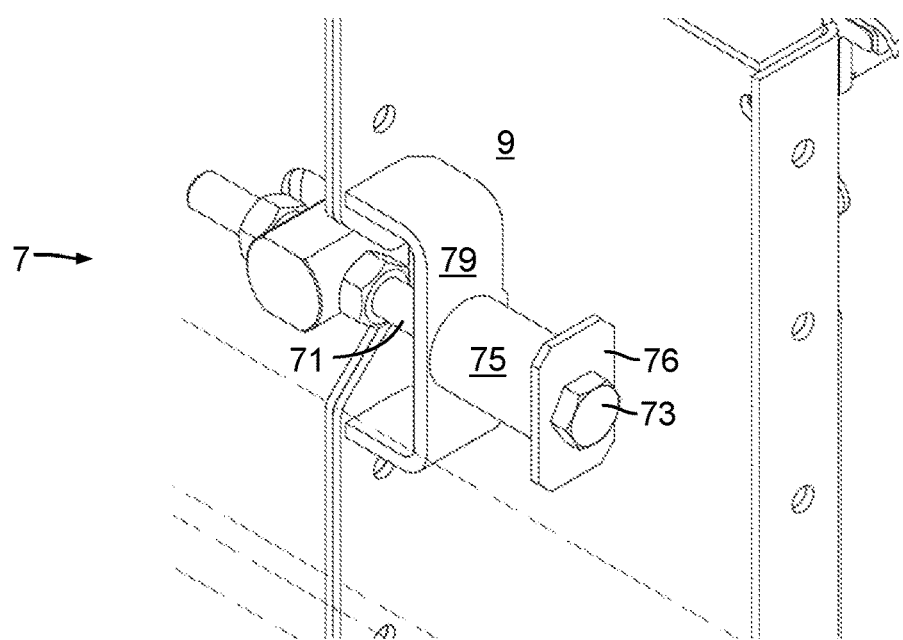
FIG. 8 depicts the tensioner of FIG. 5 in a perspective view, where in figure panel b) the limiting bushing is shown transparent.
Figure 8:
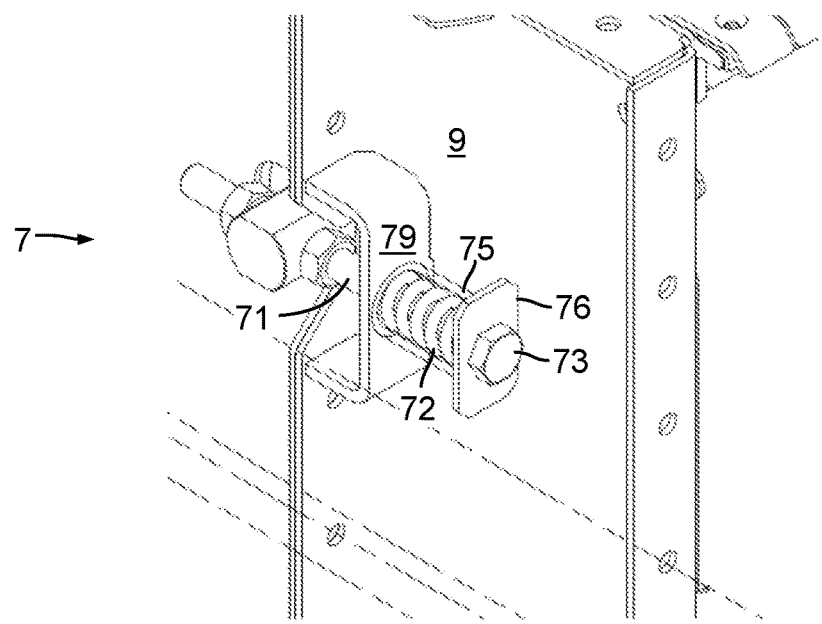

During installation of the transfer device 20, the traction belt 27 is initially in a non-tensioned state (see FIG. 7, panel a). Now the limiting bushing 75 is held loose between the screw nut 73 and the stop 79. The length S of the spring 72 is quite large meaning that the spring force is low. The spring 72 may be fully released.

For increasing the belt tension, an operator is turning the screw nut 73 clockwise; for decreasing the belt tension, the screw nut 73 is to be turned counterclockwise.

As the belt tension is increased, the spring 72 abuts the screw nut 73 and the stop 79. The spring is now compressed between screw nut 73 and the stop 79 (FIG. 7, panel b). The operator continues to tension the spring 72 up to an amount, where the bushing 75 is still held with an axial play between the stop 79 and the screw nut 73. A length S of the spring 72 is still larger than a length B of the limiting bushing 75. In this situation, there is a balance between the spring force and the tension force of the traction belt 27. Considering the spring parameters, the length S of the spring 72 represents a measure of the spring tension and thus of the tension of the traction belt 27.

As the operator continues to increase the belt tension, also the limiting bushing 75 abuts both the screw nut 73 and the stop 79 and will be compressed between screw nut 73 and the stop 79 (FIG. 7, panel c). A length S of the spring 72 is equal to a length B of the limiting bushing 75.

Now the limiting bushing 75 is clamped between the screw nut 73 and the stop 79 without any play. The omitted play is an indicator, that the maximum tension is achieved. Now the operator slightly releases the tension to get into a situation where the limiting bushing 75 is again held with play between the screw nut 73 and the stop 79.

Alternatively, the turning of the screw nut 73 can be done by the actuator 711 (see FIG. 6).

Within this application, the threaded rod 71 and the screw nut 73 is to be considered as a tensioning screw. Various other embodiments are possible to realize a tensioning screw.

According to the above the clamping state of the limiting bushing 75 is an indicator for the correct tension of the traction belt 27.

Optionally an intermediate plate 76 may be arranged between the screw nut 73 and the spring 72.

The invention supports the following requirements according to which the transfer device 20 is operated:
- a) The transfer device 20 is able to selectively operate the traction belt 27 in both directions. Accordingly, the traction belt 27 can selectively be driven in a manner, that in a first operation mode, the driven wheel 291 pulls at the upper run 273 (direction R1) and that in a second operation mode, the driven wheel 291 pulls at the lower run 274 (direction R2).
- b) The wear condition of the traction belt 27 can always be monitored with the help of the limiting bushing 75. According to the specific embodiment of the figures, as long as the play of the limiting bushing 75 does not exceed a certain amount, the belt tension of the traction belt 27 is not subject to relevant belt length increase. Merely for reference, the requirement would not be supported in case that the deflection wheel axle 29A would be fixed to the frame 28 after adjusting the belt tension. Therefore is advantageous that the deflection wheel axle 29A is not fixed.
- c) Over its entire circumference the traction belt 27 is equipped with the belt carriers 21 (only a few of which are shown in FIG. 5). Additionally over its entire circumference, the traction belt 27 and the belt carriers 21 are subjected to a forced guidance by the guide 23. As a consequence, the traction belt 27 underlies a plurality of mechanical impacts preventing free oscillation of the traction belt 27. Conventional methods for monitoring the belt status by observing the oscillations cannot be applied in the present transfer device 20.
- d) The traction belt 27 is connected to the driven wheel 291 in a positive manner. This is important to enable speed synchronization with other devices cooperating with the transfer device 20. The positive drive connection always requires a minimum distance between the two deflection wheels 291, 292; otherwise, the traction belt 27 may jump over positive projections of the driven wheel 291, in case the distance between the two deflection wheels 291, 292 would be too small. The limiting bushing 75 ensures said minimum distance, so that the deflection wheels 291, 292 are not pulled too close to each other.

LIST OF REFERENCE SIGNS 1 conveyor arrangement
3 transfer area
7 tension device
9 object
10 conveying device
11 conveying roller
20 transfer device
201 conveying surface
21 belt carrier
23 guide
24 transfer belt
241 support surface
26a first transfer location
26b second transfer location
26f conveying area
27 traction belt
271 connector
272 engagements
273 upper run
274 lower run
28 frame
29 drive
291 deflection wheel/driven wheel
292 deflection wheel/undriven wheel
29A deflection wheel axle
7 tensioner
71 threaded rod
72 spring
73 screw nut
75 limiting bushing
76 intermediate plate/washer
79 stop
710 wrench
711 actuator
712 control signal
A second, lateral direction
B length of limiting bushing
FR conveying direction
FE conveying plane
Q traverse direction
P pulling/tensioning force
R1 first operation direction/counterclockwise
R2 second operation direction/clockwise
S spring length

What is claimed is:

1. A transfer device (20), adapted to convey an object (9) in a conveying direction (FR), and selectively transfer an object (9) in a second direction (A) angled to the conveying direction (FR), the transfer device (20) comprising:
   - a plurality of belt carriers (21), circumferentially running along the transfer device (20),
   - a traction belt (27) circumferentially running along the transfer device (20), along which the plurality of belt carriers (21) is arranged;
   - a tensioner (7), which is adapted to change a tension of the traction belt (27);
   - circumferentially running transfer belts (24) forming an upper run (273) and a lower run (274);
   - wherein each belt carrier (21) carries a transfer belt (24), which protrudes above the belt carrier (21), and wherein the plurality of transfer belts (24) defines a conveying plane (FE), on which said object (9) comes to rest during conveying;
   - wherein for laterally transferring the object (9) the transfer belts (24) are selectively driven;
   - wherein the tensioner (7) comprises a force limiter (75), limiting tensioning force (P) which is applied by a force storage (72) to the traction belt (27); and
   - wherein a distance holder (72) and/or the force limiter (72) is adapted to bridge a length of a spring (27).

2. The transfer device (20) according to claim 1, characterized in that the tensioner (7) comprises the force storage (72), in particular the spring (72), which is adapted to provide the tensioning force (P).

3. The transfer device (20) according to claim 1, characterized in that the traction belt (27) is wound around two deflection wheels (291, 292), and that the tensioner (7) comprises the distance holder (75), wherein the distance holder (75) is adapted to ensure a minimum distance between said two deflection wheels (291, 292).

4. The transfer device (20) according to claim 1, characterized in that the distance holder (72) is the force limiter (72).

5. The transfer device (20) according to claim 3, characterized in that the distance holder (72) and/or the force limiter (72) is a bushing, located coaxially around the spring (72).

6. The transfer device (20) according to claim 1, characterized in that the transfer device (20) is able to selectively operate the traction belt (27) in two directions (R1, R2), in particular, the traction belt (27) can selectively be driven in a manner, that in a first operation mode a driven wheel (291) pulls the upper run 273 (direction R1) and that in a second operation mode a driven wheel (291) pulls the lower run (274) of the traction belt (27).

7. The transfer device (20) according to claim 6, characterized in that the transfer device (20) comprises a plurality of deflection wheels (291, 292) for deflecting the traction belt (27), wherein all deflection wheels (291, 292) deflect the traction belt inwardly.

8. The transfer device (20) according to claim 7, characterized in that the plurality of the deflection wheels (291, 292) comprises exactly two deflection wheels (291, 292) per traction belt (27).

9. Use of a transfer device (20) according to claim 8, wherein for adjusting the tension of the traction belt (27) the tensioner (7) is operating in a manner that after the belt tension is adjusted correctly the distance holder and/or the force limiter (75) is held with play.

\* \* \* \* \*